United States Patent [19]

Van Aller et al.

[11] Patent Number: 5,369,268
[45] Date of Patent: Nov. 29, 1994

[54] X-RAY DETECTOR WITH CHARGE PATTERN READ-OUT BY TFT SWITCHING MATRIX

[75] Inventors: Gerardus Van Aller, Heerlen, Netherlands; Ulrich Schiebel, Aachen, Germany

[73] Assignee: U.S. Philips Corporation, New York, N.Y.

[21] Appl. No.: 197,105

[22] Filed: Feb. 15, 1994

Related U.S. Application Data

[63] Continuation of Ser. No. 951,514, Sep. 25, 1992, abandoned.

[30] Foreign Application Priority Data

Sep. 27, 1991 [EP] European Pat. Off. ........ 91202532.7

[51] Int. Cl.$^5$ .............................................. H01J 40/14
[52] U.S. Cl. ............................. 250/214 VT; 313/523
[58] Field of Search ............... 250/214 VT; 313/523, 313/531

[56] References Cited

U.S. PATENT DOCUMENTS

| | | | |
|---|---|---|---|
| 3,825,763 | 7/1974 | Cornelis et al. | 250/486 |
| 4,204,118 | 5/1980 | Sheldon | 250/315.2 |
| 4,382,187 | 5/1983 | Fraleux et al. | 250/578 |
| 4,413,280 | 11/1983 | Adlerstein et al. | 358/111 |
| 4,837,631 | 6/1989 | Hicks | 250/214 VT |
| 5,013,902 | 5/1991 | Allard | 250/214 VT |
| 5,017,989 | 5/1991 | Street et al. | 357/30 |
| 5,103,083 | 4/1992 | Reed et al. | |
| 5,138,147 | 8/1992 | Van Aller et al. | 250/213 |

FOREIGN PATENT DOCUMENTS 0450670 10/1991 European Pat. Off. .

OTHER PUBLICATIONS

"X-Ray Camera Tube with SEC Target" E. Fenner et al., Adv. Electr. and Electr. Physics, 33B, 1972, pp. 1061–1067.

*Primary Examiner*—David C. Nelms
*Attorney, Agent, or Firm*—Jack D. Slobod

[57] ABSTRACT

An X-ray image amplifier tube designed with an input screen having a photocathode and with a detection screen which is opposite the latter and a short distance away for detection of a photo-electron beam which is generated by X-ray input image signals and is amplified in the tube. The detection screen is provided with a conversion coating for converting an image-carrying photo-electron beam into a potential excursion and to this end contains, for example, an amorphous selenium coating or a porous KCl coating. A variable potential can be applied both over the vacuum gap between the photocathode and the conversion coating and over the conversion coating itself and, as a result of this, high image brightness dynamics can be achieved without image disruption.

20 Claims, 1 Drawing Sheet

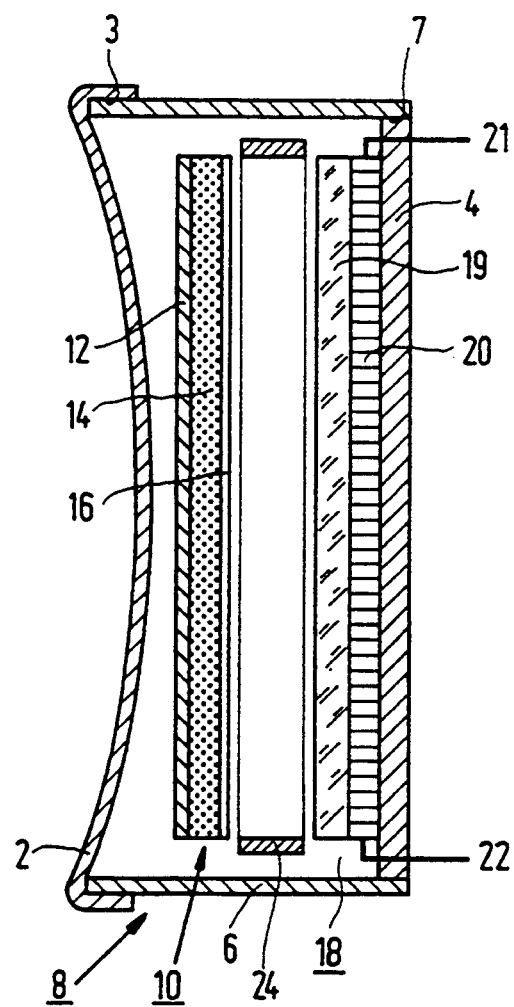

X-RAY DETECTOR WITH CHARGE PATTERN READ-OUT BY TFT SWITCHING MATRIX

This is a continuation of application Ser. No. 07/951,514, filed Sep. 25, 1992, abandoned.

BACKGROUND OF THE INVENTION

1. Field of the Invention

The invention relates to an X-ray detector which has a casing to which a vacuum can be applied, an input screen provided with a luminescent coating and an output screen able to give location-sensitive read-out. The invention also relates to an X-ray examination apparatus for medical diagnoses provided with such an X-ray detector.

2. Description of the Related Art

An X-ray detector of this type is disclosed in EP-A-450,670, which corresponds to U.S. Pat. No. 5,138,147. In the detector described in this patent, image detection is obtained by conversion of an image-carrying X-ray beam, via luminescence, into an image-carrying beam of photo-electrons. The photo-electrons are accelerated over a vacuum gap and electrons accelerated in this way are either detected directly via electron-sensitive diode elements or converted in a phosphor coating into light which is detected via a light-sensitive diode matrix. In both cases use is made of a TFT switching matrix for location sensitivity.

In the case of read-out using a photodiode matrix, the amplification variation desired for medical X-ray examination is difficult to achieve with a detector of this type. Furthermore, in this case the technological problem arises that the diodes usually are not well able to withstand a high heating temperature desired for other purposes.

In principle, the desired amplification variation can be achieved with an electron-sensitive diode matrix read-out, but as yet factory production of such a diode matrix does not appear to be easy.

SUMMARY OF THE INVENTION

The object of the invention is, inter alia, to overcome the said disadvantages and to this end an X-ray detector of the type mentioned in the preamble is, according to the invention, characterised in that a conversion coating or layer is added to the output screen for conversion of incident electrons into an electric charge pattern which can be read out.

The diode matrix is superfluous in a detector according to the invention and the limitations imposed by this matrix are removed. Since a voltage which controls the amplification can be applied over the conversion coating, the restriction in this respect is also overcome. An additional advantage is, furthermore, that standard TFT matrices can be used for image location.

In a preferred embodiment, there is an evacuated gap, over which an adjustable potential difference can be applied, between the photocathode and the conversion coating. With a given inherent amplification of the conversion coating, an amplification which is already sufficiently large and sufficiently variable for many applications can be achieved by this means. In order further to adjust the magnitude or setting of this amplification, in a preferred embodiment an adjustable potential difference can also be applied over the conversion coating. By this means, a large amplification variation is possible without use having to be made of impractically high potential differences. An additional advantage is that potential difference variations over the conversion coating do not have an adverse effect on the electron-optical imaging, as can easily occur over a vacuum gap.

In a further preferred embodiment, the conversion coating forms part of the location-sensitive output screen and, to this end, is preferably applied directly to the TFT matrix by vapour deposition. If desired, an interlayer which transmits charge patterns well and does not disturb them, can be applied between the TFT matrix and the conversion coating, for example in order to prevent the coatings having an adverse chemical effect on one another.

In a preferred embodiment, the conversion coating substantially consists of amorphous selenium. Preferably, a selenium coating of this type is applied to the TFT matrix by vapour deposition and is, for example, about 50 $\mu$m thick. A reduced thickness of this type limits dispersion of image information in the coating and makes it possible to apply an amplification-controlling potential difference over said coatings.

It is pointed out that a selenium coating for conversion of X-radiation into a charge pattern is known per se from U.S. Pat. No. 4,413,280. In this patent said coating also acts as input screen for direct conversion of X-ray quanta into electrons which are accelerated—the document does not state how—as free electrons over a vacuum gap and are read out using a diode matrix.

In a further preferred embodiment, the conversion coating substantially consists of porous KCl.

As a result of the porous structure, a coating of this type acts more or less in the same way as a channel plate and, in fact, it is, moreover, still the case that a charge pattern is built up and not that an electron beam is released. By functioning in this way, a coating of this type already permits a relatively high amplification variation with a relatively low potential difference variation. A significant advantage of such a KCl layer coating over an amorphous selenium coating is also that KCl is much less sensitive to heat treatments. In the case of a selenium coating undesired recrystallisation can occur relatively easily during such treatment.

In a further preferred embodiment, the input screen and the output screen are incorporated in a vacuum housing at a suitable distance from one another. For location-dependent read-out, use is preferably made of a TFT matrix of switching elements which is known per se, said elements preferably being arranged in an orthogonal pattern and being capable of actuation via line and column connections for read-out. For a more detailed description of read-out methods of this type, reference is made to, for example, U.S. Pat. No. 4,382,187.

BRIEF DESCRIPTION OF THE DRAWING

A few embodiments according to the invention will be explained in more detail below with reference to the drawing wherein the single FIGURE is a cross-sectional view of an X-ray detector according to the invention.

DETAILED DESCRIPTION OF THE PREFERRED EMBODIMENT

The single FIGURE in the drawing shows an X-ray detector having an input window 2, which is made, for example, from aluminium, titanium or glassy carbon or from a laminate, in order to provide adequate strength and X-ray radiation transmissivity, and an output wall section 4 which in this case acts as vacuum wall and as support for an output screen and is formed, for example, by a metal plate. The input window 2 and the output wall section 4 are connected to one another via connections 3 and 7 via a cylindrical casing 6, which preferably has a rectangular or in particular a square cross-section and is made, for example, from stainless steel. A casing 8 which is formed in this way and to which a vacuum can be applied has, for example, a thickness dimension of at most about 5 cm for an effective input screen with a cross-section of, for example, 40×40 cm or a cross-section of, for example, about 40×60 cm² adapted to the width-height ratio of a conventional television monitor.

An input screen 10 which has an input luminescent coating or layer 14, on a support 12 or applied directly to the input window, and a photocathode (or photocathode layer) 16 are located in the casing 8. The support consists, for example, of aluminium and the luminescent coating is formed, for example, by a structured CsI coating as described in U.S. Pat. No. 3,825,763.

At a distance of, for example, 0.5 to 1 cm from the photocathode 16 there is an output screen 18 which has a conversion coating 19 and an integral switching matrix 20, for example designed as a TFT matrix. Here the conversion coating 19 is applied directly to the matrix 20, optionally with the addition of a separating layer which is not indicated in more detail. The matrix located in the casing can be sensitively actuated and read out via an orthogonal system of leads 21 and 22. A screen or a correction electrode 24, for example in the form of a ring or a gauze electrode, is incorporated between the input screen and the output screen. A channel plate amplifier is also incorporated between the input screen and the output screen, said amplifier directing an amplified photo-electron beam, without it spreading, to the output screen.

A channel plate of this type makes a relatively wide range of amplification control possible with relatively low potential variations. A detector matrix 20 contains a number of, for example, 2000×2000 image elements or image pixels, each being, for example, 0.2×0.2 mm² in size, which are preferably arranged in an orthogonal structure. Read-out is exactly, for example substantially, in accordance with a method described in U.S. Pat. No. 4,382,187 via the orthogonal electrode system 21, 22.

The conversion coating 19 of the output screen consists, for example, of amorphous selenium, of porous KCl or of another material which has the characteristic that an incident image-carrying beam of photo-electrons is converted into a potential excursion at a, preferably opposite, surface of the coating. To this end it is advantageous to apply a potential difference between an input plane and an output plane of the conversion coating. A potential difference of this type will direct charge carriers occurring in the coating, as a result of which lateral spread is restricted. Moreover, with the variable potential difference it will be possible to achieve amplification control. If an amorphous selenium layer is used as conversion coating, electron-hole pairs are formed by incident (photo-)electrons, the electrons of such pairs, for example, which pass relatively rapidly through the coating, forming a potential excursion at the read-out side of the conversion coating at a suitable potential difference.

A potential excursion of this type can be read out directly by means of the integral matrix. A significant advantage of the design according to the invention is that, since a photo-electron beam is first formed, the conversion coating does not have to convert X-ray quanta directly into charge carriers, as a result of which the layer can be much thinner, for example 50 $\mu$m instead of a few hundred $\mu$m. Moreover, a higher image amplification and greater amplification dynamics can be achieved with photo-electrons by electron acceleration.

Although the conversion process is physically different when, for example, a porous KCl coating, the porosity of which can be, for example, up to 95%, is used, charge carriers transmitted therein—in this case even more the electrons—will also be able to generate potential excursion at a read-out side. The use of a porous KCl coating to generate a potential excursion by incident radiation is known per se from an article by E. Fenner et al. in Adv. Electr. and Electr. Physics 33B, 1972, pp. 1061–1067. In this article, the coating is used in a television camera tube for light-optical image detection, the potential excursion formed being read out using a scanning electron beam.

We claim:

1. An X-ray detector comprising a vacuum-tight casing within which an input screen and an output screen are contained, said input screen having a luminescent layer for producing light radiation in response to incident X-ray radiation and a photocathode layer for producing photoelectrons in response to the light radiation produced by said luminescent layer, and said output screen being positioned relative to said input screen for receiving incident electrons resulting from the photoelectrons produced by the photocathode layer and having a conversion layer for converting said incident electrons into an electric charge pattern, and a switching matrix fixedly positioned for direct readout of said electric charge pattern.

2. An X-ray detector as claimed in claim 1, wherein said input and output screens are separated by a gap and further comprising electrode means for receiving a potential difference for accelerating, within said gap, said photoelectrons produced by said photocathode layer toward said output screen.

3. An X-ray detector as claimed in claim 2, wherein said electrode means is configured for applying said potential difference to said gap via said conversion layer.

4. An X-ray detector as claimed in claim 1, wherein the conversion layer substantially consists of amorphous selenium.

5. An X-ray detector as claimed in claim 4, wherein said conversion layer has been formed by vapor deposition of a coating of said amorphous selenium over a surface of said output screen, said coating having has a thickness of about 50 $\mu$m.

6. An X-ray detector as claimed in claim 1, wherein the conversion layer substantially consists of porous KCl.

7. An X-ray detector as claimed in claim 6, wherein the conversion layer substantially consisting of porous KCl has a porosity corresponding to a fill factor of up to at most about 10%.

8. An X-ray detector as claimed in claim 2, wherein the conversion layer substantially consists of amorphous selenium.

9. An X-ray detector as claimed in claim 3, wherein the conversion layer substantially consists of amorphous selenium.

10. An X-ray detector as claimed in claim 8, wherein said conversion layer has been formed by vapor deposition of a coating of said amorphous selenium over a surface of said output screen, said coating having has a thickness of about 50 μm.

11. An X-ray detector as claimed in claim 9, wherein said conversion layer has been formed by vapor deposition of a coating of said amorphous selenium over a surface of said output screen, said coating having has a thickness of about 50 μm.

12. An X-ray detector as claimed in claim 2, wherein the conversion layer substantially consists of porous KCl.

13. An X-ray detector as claimed in claim 3, wherein the conversion layer substantially consists of porous KCl.

14. An X-ray detector as claimed in claim 12, wherein the conversion layer substantially consisting of porous KCl has a porosity corresponding to a fill factor of up to at most about 10%.

15. An X-ray detector as claimed in claim 13, wherein the conversion layer substantially consisting of porous KCl has a porosity corresponding to a fill factor of up to at most about 10%.

16. An X-ray detector as claimed in claim 1, wherein said switching matrix is a TFT switching matrix.

17. An X-ray examination apparatus comprising an X-ray source for irradiating an examination area and an X-ray detector for receiving X-ray radiation exiting said examination area as a result said irradiating and being incident upon said detector, said detector comprising a vacuum-tight casing within which an input screen and an output screen are contained, said input screen having a luminescent layer for producing light radiation in response to incident X-ray radiation and a photocathode layer for producing photoelectrons in response to the light radiation produced by said luminescent layer, and said output screen being positioned relative to said input screen for receiving incident electrons resulting from the photoelectrons produced by the photocathode layer and having a conversion layer for converting said incident electrons into an electric charge pattern, and a switching matrix fixedly positioned for direct readout of said electric charge pattern.

18. An X-ray examination apparatus as claimed in claim 17, wherein said input and output screens are separated by a gap and further comprising electrode means for receiving a potential difference for accelerating, within said gap, said photoelectrons produced by said photocathode layer toward said output screen.

19. An X-ray examination apparatus as claimed in claim 18, wherein said electrode means is configured for applying said potential difference to said gap via said conversion layer.

20. An X-ray examination apparatus as claimed in claim 17, wherein said switching matrix is a TFT switching matrix.

* * * * *